United States Patent Office 3,689,438
Patented Sept. 5, 1972

3,689,438
CATION EXCHANGE MEMBRANES AND
THEIR PREPARATION
Guy Bourat, Bourg-la-Reine, and Rodolphe Margraff, Ris-Orangis, France, assignors to Rhone-Poulenc S.A., Paris, France
No Drawing. Filed Mar. 29, 1971, Ser. No. 129,172
Claims priority, application France, Apr. 29, 1968, 149,933
Int. Cl. C08f 33/08; C08j 1/34; B01k 3/10
U.S. Cl. 260—2.2 R                    19 Claims

ABSTRACT OF THE DISCLOSURE

Cation exchange resins are made from crosslinked poly-p-vinylphenols containing cation exchange groups mixed with an inert polymer.

The present invention relates to cation exchange membranes, and processes for their preparation.

British patent specification No. 948,961 describes resins which are ion exchangers and/or possess chelating properties, based on poly-p-vinylphenol, which can, inter alia, be used as membranes. The preparation of these resins comprises the following stages. An ester of para-vinylphenol is first polymerised in the presence of a crosslinking agent. The polymer obtained is hydrolysed. Finally the reactive groups (ion exchange groups and/or groups possessing chelating properties) are introduced. The crosslinking agents used are essentially divinyl compounds, preferably divinylbenzene.

Such a method of operation, in which the polymerisation and crosslinking are carried out simultaneously, does not allow membranes which are at the same time flexible and homogeneous and which have good mechanical properties to be obtained.

The present invention provides cation exchange membranes based on poly-p-vinylphenol which are flexible, homogeneous and have good mechanical properties. They furthermore have a low resistance to the passage of an electric current as well as other advantages and properties which will emerge from the description which follows.

These membranes are made of a homogeneous mixture of (a) a poly-p-vinylphenol, which is optionally halogenated, which is crosslinked via the oxygen atoms of its hydroxyl groups and substituted by cation exchange radicals, and (b) an inert polymer. By an "inert polymer" is meant a polymer which does not interfere with the crosslinking of the poly-p-vinylphenol or introduction of the cation-exchange radicals as described in detail below, and which in particular is inert to halogenated compounds and sultones.

These membranes can be prepared by first preparing a solution in an organic solvent which contains the inert polymer and the poly-p-vinylphenol, spreading the solution on a surface and then, either successively or simultaneously, evaporating the solvent, crosslinking the poly-p-vinylphenol by reaction at its hydroxyl groups and introducing the cation exchange groups.

In the following description of the present invention the non-crosslinked poly-p-vinylphenol which is optionally substituted by halogen atoms is referred to as the polyphenol. By the expression "crosslinking" is meant a crosslinking by the formation of bridges between the polyphenol chains via the oxygen atoms of the hydroxyl groups. The solution containing the polyphenol and the inert polymer is referred to as the initial polymer solution.

The polyphenol may be prepared by any known method [cf. Stern et al., J. Amer. Chem. Soc. 79 5792 (1957); Savish, J. Org. Chem. 24 1345–7 (1959)]. Thus it is possible simply to polymerise p-vinylphenol. According to a preferred process, a polymer of a p-vinylphenol ester such as poly-p-acetoxystyrene is saponified. The polyphenols which are substituted by halogen atoms may be obtained by halogenation of polyphenols (Packham, J. Chem. Soc. 1964 2620).

Generally polyphenols of molecular weight of between 600 and 400,000 are used. However, molecular weights outside this range are not excluded.

The inert polymer is preferably polyvinyl chloride or a copolymer of vinyl chloride with other ethylenically unsaturated monomers such as, for example, vinylidene chloride, vinyl alkanoate esters such as vinyl acetate and vinyl propionate, and alkyl maleates in which the alkyl radicals possess up to four carbon atoms. The molecular weight of the inert polymer is advantageously above 150,000.

The proportion of polyphenol based on the combination of polyphenol-inert polymer is usually 20 to 80% and preferably 30 to 50%.

The initial polymer solution is prepared by successively or simultaneously dissolving the polyphenol and the inert polymer in an organic solvent or mixture of solvents, or by mixing two solutions of which one contains the polyphenol and the other the inert polymer.

The process of dissolving these various polymers is conventional. The solvents used must dissolve both the polyphenol and the inert polymer. The preferred solvent is cyclohexanone.

In order to obtain a more homogeneous film of better mechanical properties after casting and evaporating the initial polymer solution, it is frequently advantageous to incorporate one or more adjuvants into this solution. Quaternary ammonium salts, optionally in the form of internal salts, are particularly useful as the adjuvant. Among the ordinary quaternary ammonium salts, salts having at least three carbon-containing chains with a greater number of carbon atoms than 6 are preferably used. Amongst the internal quaternary ammonium salts the sulphobetaines, and especially the sulphobetaines having at least one long hydrocarbon chain (6 to 20 carbon atoms) attached to the nitrogen atom, are preferably used. These quaternary ammonium salts are advantageously present in an amount of between 2 and 10%, and preferably 5 to 7%, of the total weight of the materials dissolved in the initial polymer solution. Good results are also obtained by combining the quaternary ammonium salt with other adjuvants such as for example esters of inorganic acids, especially alkyl phosphates.

As other homogenisation adjuvants, hexaalkylphosphotriamides, and especially hexamethylphosphotriamide, may also be used. These adjuvants are advantageously used in a ratio of 1 to 3 mols per phenol unit present in the polymer solution. If the polyphenol has a lower molecular weight than 10,000, this latter category of adjuvants is preferably used.

All these various adjuvants may be used separately or together.

Once the initial polymer solution has been prepared, it is spread on a surface or on a support the geometry of which determines the shape of the final membrane. It is advantageous to use an amount of initial polymer solution such that the film obtained after casting and evaporating the solvent contains 10 to 300 g. of the mixture of polyphenol-inert polymer per square metre and preferably 50 to 150 g./m.². Thus membranes can be prepared in the form of a sheet, or a bag or tube. Generally the majority of devices use flat membranes. To obtain reinforced membranes the polymer solution can also be spread on a web or a woven fabric. In all these cases a liquid film is obtained after casting which is subjected to the subsequent processes of drying, crosslinking and introducing cation exchange groups.

The three operations of drying, crosslinking and introducing cation exchange groups may take place simultaneously or successively and separately, or successively and overlapping one another.

The drying or evaporation of the solvent where the latter is cyclohexanone advantageously takes place at atmospheric pressure and at a temperature below 80° C. It is also possible to work in a partial vacuum.

The product obtained after drying the initial liquid polymer solution film is hereafter called the intermediate film. It contains polyphenol which is slightly crosslinked or non-crosslinked.

Various methods of crosslinking may be used, with all these various methods having a common feature in the fact that they join the various polyphenol chains to one another via the oxygen atoms of the hydroxyl groups.

According to one embodiment, crosslinking is carried out by creating ether bridges by dehydration of the hydroxyl groups of the polyphenol. A thermal dehydration is preferably carried out, for example by subjecting the intermediate film to a temperature of 60° C. to 150° C., more particularly 80° C. to 120° C., for a period of 1 to 8 hours, in a liquid medium which does not react with the constituents of the film. This liquid medium can, for example, be a paraffin or aromatic hydrocarbon, or an ether, and can furthermore contain up to 20% by weight of a polar substance such as hexamethylphosphotriamide or dioxane.

This crosslinking by thermal dehydration is generally sufficient to render the polyphenol completely insoluble in aqueous or alcoholic alkaline media such as those which can be used to convert the polyphenol to an alkali metal polyphenate.

Where the evaporation of the solvent to produce the intermediate film has taken place at a relatively high temperature, the crosslinking by dehydration may already have started during this drying stage.

In another method of crosslinking, a chemical reagent capable of reacting with the phenolic hydroxyl groups which have optionally been converted to salts beforehand by alkaline reagents, is reacted with the polyphenol.

Thus it is possible to crosslink two phenol groups by acetalisation according to the methods known for the preparation of acetals.

Compounds containing at least two relative halogen (e.g. chlorine or bromine) atoms can also be used. As compounds of this type, ortho- and para-bis(halogenomethyl)benzene, also called o- and p-xylylene dihalides, and 3,3-bis(halogenomethyl)oxetane may especially be quoted. Before reacting these compounds with the polyphenol it is necessary to convert the phenolic hydroxyl groups at least partially to a salt, for example with alkali metal hydroxides or alcoholates. This salification is generally effected by simple immersion of the intermediate film in an aqueous or alcoholic solvent containing the alkali. In the case of an aqueous solution, this immersion must however be sufficiently brief not to cause the polyphenol to migrate out of the film.

The compounds possessing mobile halogen atoms can be reacted with the intermediate film either externally or internally. If the process is carried out externally, the intermediate film is immersed in a solution of the crosslinking agent. Simple heating suffices to cause the crosslinking. The progress of this reaction can be followed easily, for example by following the appearance of isonisable halogen in the reaction medium, and this makes it possible to determine the optimum temperature and duration of heating. If the internal procedure is followed, the difunctional crosslinking agent is incorporated into the initial polymer solution and the intermediate film is heated as above.

It is also possible to use compounds which are simultaneously capable of crosslinking and of introducing ion exchange groups.

The polysultones, and preferably the di-γ-sultones, may especially be used for this purpose, such as the di-γ-sultone of 1,2-bis(p-nitro-o-sulphophenyl)-ethane-diol-1,2 acid [Ruggli et al., Helv. Chim. Acta 9 929–50 (1926)], methylenedinaphthosultone [Schetty, Helv. Chim. Acta 31 1229 (1948)], dinaphthosultone [Allport, J. Chem. Soc. 1958 4090–4], and above all the di-γ-sultone of 2,2 - bis(hydroxymethyl)propane - 1,3 - disulphonic acid [Goethals et al., Bull. Soc. Chim. Belge 70 218–20 (1961)] hereafter referred to as spirobi-2:2'-propanesultone.

Before the reaction with these sultones it is necessary, as in the case of the compounds having mobile halogen atoms, to replace the hydrogen of the hydroxyl group by an alkali metal. As in the case of the dihalogenated compounds, the reaction of the polysultones with the polyphenol can be carried out internally or externally by simple heating. In the case of the di-γ-sultones it is however advantageous to treat the intermediate film with the disultone in a medium which favours hydrogen bonds, for example in an alcohol. It is also possible to use other crosslinking agents such as, for example, compounds which simultaneously possess a sultone group and one or more mobile halogen atoms.

It is also possible to use several of these different crosslinking agents conjointly or successively.

The degree of crosslinking varies depending on the molecular weight of the polyphenol used and according to the permeation selectivity desired of the membrane. If a polyphenol of molecular weight below 10,000 is used, it is generally advantageous to crosslink 10 to 80%, and preferably 20 to 50%, of the phenolic hydroxyl groups. If a polyphenol of molecular weight above 10,000 is used a less extensive crosslinking is in practice employed. The proportion of hydroxyl groups crosslinked is usually 5 to 50% and preferably 10 to 30%. The intermediate film which has been crosslinked in this way to the desired extent may or may not already contain cation exchange groups depending on the crosslinking process which has been employed. In the case where crosslinking has been carried out with a polysultone up to a very high degree of crosslinking, for example of more than 50% of the hydroxyl groups, the amount of ion exchange groups may be considered sufficient, which thus makes it unnecessary to carry out an additional introduction of cation exchange groups. In other cases it is appropriate to proceed to introduce such groups in addition to the crosslinking. This introduction is generally an independent stage in the process of preparation of the membranes of the invention. It is however possible to effect this introduction simultaneously with one of the preceding stages of the preparation.

The types of cation exchange groups which can be introduced into the membranes of the invention and the processes for their introduction are very varied. However the processes described below, which can be employed separately, successively or conjointly, are preferably employed.

According to a first process, the aromatic nuclei are sulphonated by a known method, using a sulphonating agent such as sulphuric acid, oleum or chlorosulphonic acid ($HSO_3Cl$). The last is the preferred reagent because it allows the process to be carried out at relatively low temperatures, which favours the mechanical preservation of the finished membranes. Preferably, this type of sulphonation is effected by immersing the previously prepared film in a solution of chlorosulphonic acid in a halogenated hydrocarbon or in an ether.

According to a second process, sulphonic groups are introduced by the reaction of a monosultone on the hydroxyl groups of the previously prepared polyphenol which have been converted to salts. Thus by "sulphonic groups"

as used herein is meant not only —$SO_3H$ groups (which are introduced with a sulphonating agent such as sulphuric acid) but also —$SO_3H$ groups which are attached to the polymer chain via an alkyloxy group i.e. hydroxysulphonyl alkyloxy groups which are introduced by the monosultone. This sulphonation may be total or partial, depending on whether or not free hydroxyl groups are to be retained in the finished membrane. The simultaneous presence of sulphonic and hydroxyl groups in the final membrane can impart to the membrane chelating properties towards certain metal ions.

In addition to their sulphonating action, the sultones possess the property of favouring dehydration between hydroxyl groups, which contributes to an increase in the degree of crosslinking and makes them of very particular value compared to other sulphonating agents.

The reaction of the sultone with the polyphenol passessing hydroxyl groups which have been converted to salts advantageously takes place by immersing and heating the film in a solution of the sultone. Hydrocarbons, alcohols or ethers can for example be used as the solvent medium.

In order to obtain membranes possessing optimum properties of permeation selectivity and electrical conductivity, it is advantageous to employ such amounts of sulphonating agent that the final membranes contain cation exchange groups in an amount of 0.5 to 3.5 milliequivalent/g., and preferably of 1 to 2 milliequivalent/g.

After having carried out all these various treatments, the resulting membrane is advantageously subjected to the action of an alkaline solution to dissolve all the compounds of low molecular weight which may be present, and is then washed with water until the wash waters are neutral.

The membranes of the invention are generally flexible and homogeneous. They can be kept either in the moist or dry state provided that they have beforehand been subjected to a treatment such as, for example, immersion in a mixture of water and glycerine. Finally, they are particularly valuable in the field of electrodialysis and in the field of fuel piles.

The following examples illustrate the invention.

EXAMPLES 1 TO 7

A series of membranes are prepared using the following procedure.

1.05 g. of poly-p-vinylphenol of molecular weight 200,000 are dissolved at ambient temperature with stirring in 50 cm.$^3$ of a solution of 1.95 g. of polyvinyl chloride of molecular weight 200,000 in cyclohexanone. 200 mg. of methyltrilaurylammonium chloride and 0.4 cm.$^3$ of tributyl orthophosphate are dissolved in this solution. This initial polymer solution is spread on a flat glass plate 20 cm. x 20 cm. The cyclohexanone is evaporated in an oven at 70° C. A transparent, colourless intermediate film is obtained. This film is steeped for one hour at 20° C. in an 0.1 N potassium methoxide solution in methanol. After rinsing with methanol, the membrane is heated in a saturated solution of spirobi-2:2'-propanesultone in isopropanol under reflux.

The examples differ from one another in the duration of this heating under reflux.

The membranes are washed with 200 cm.$^3$ of normal potassium hydroxide solution and then with water until the wash waters are neutral. Flexible and macroscopically homogeneous membrances are thus obtained having the sulphur content indicated in the table below:

| Example | Duration of heating in hours | Sulphur content (percent by weight) |
|---|---|---|
| 1 | 15 | 0.9 |
| 2 | 20 | 1.3 |
| 3 | 21 | 1.35 |
| 4 | 25 | 1.7 |
| 5 | 45 | 2.9 |
| 6 | 70 | 3.2 |
| 7 | 95 | 3.2 |

The membranes of Example 6 and 7 have a substitution resistance of 10Ω cm.$^2$ measured in an 0.6 M aqueous solution of KCl. (The variation in electrical resistance of a liquid column, if the membrane is substituted for a slice of liquid of the same thickness and of the same surface area as the membrane, in a position at right angles to the axis of the column, is called the electrical substitution resistance for a given membrane surface.)

EXAMPLE 8

A membrane prepared according to Example 7 is immersed for one hour in an 0.1 N solution of potassium methoxide in methanol at 20° C. After rinsing with methanol, the membrane is heated for 4 hours at 100° C. in a 4% strength solution of propanesultone in xylene. After washing with potassium hydroxide solution and with water as in Examples 1 to 7, a flexible homogeneous membrane is obtained which contains 6.5% of sulphur and of which the substitution resistance measured as above is 5Ω cm.$^2$.

EXAMPLE 9

A membrane prepared according to Example 7 is immersed for 24 hours in a 10% strength solution of chlorosulphonic acid in a mixture of equal volumes of dioxane and dibutyl ether at 20° C. After the usual washing processes, a flexible homogeneous membrane is obtained which contains 3 milliequivalents/g. of sulphonic acid groups, which still possesses free phenol groups and which has a substitution resistance, measured as above, of 1.2Ω cm.$^2$.

EXAMPLES 10 AND 11

The isopropanol of Example 7 is replaced by n-butanol (Example 10) or by isobutanol (Example 11). The increase in the reflux temperature makes it possible to achieve the same degree of crosslinking (3.2% of sulphur) in 20 hours without a change in the membrane.

EXAMPLE 12

The membrane obtained in Example 11 is successively treated with propanesultone as in Example 8 and then with chlorosulphonic acid as in Example 9. A flexible, homogeneous membrane containing 9.6% of sulphur is obtained.

EXAMPLE 13

A membrane is prepared under the conditions of Example 7, starting with an initial polymer solution containing: 0.9 g. of poly-p-vinylphenol of molecular weight 200,000, 2.1 g. of polyvinyl chloride of molecular weight 200,000, 52.5 cm.$^3$ of cyclohexanone, 200 mg. of methyltrilaurylammonium chloride, and 0.4 cm.$^3$ of tributyl orthophosphate.

A flexible, homogeneous membrane containing 2.7% of sulphur is obtained.

EXAMPLE 14

The membrane prepared in Example 13 is subjected to the action of propanesultone as in Example 8. A flexible homogeneous membrane containing 5.8% of sulphur is obtained.

EXAMPLE 15

The membrane prepared in Example 14 is subjected to the action of chlorosulphonic acid as in Example 9. A flexible, homogeneous membrane containing 8% of sulphur is obtained.

EXAMPLE 16

Using the conditions of Example 7, a membrane is prepared from an initial polymer solution containing: 1.2 g. of poly-p-vinylphenol of molecular weight 200,000, 1.8 g. of polyvinyl chloride of molecular weight 200,000, 52.5 cm.$^3$ of cyclohexanone, 200 mg. of methyltrilaurylammonium chloride, and 0.4 cm.$^3$ of tributyl orthophosphate.

A flexible, homogeneous membrane containing 3.5% of sulphur is obtained.

EXAMPLE 17

The membrane obtained in Example 16 is treated with propanesultone as in Example 8. A flexible, homogeneous membrane containing 7% of sulphur is obtained.

EXAMPLE 18

The membrane obtained in Example 17 is treated with chlorosulphonic acid as in Example 9. A flexible, homogeneous membrane containing 10% of sulphur is obtained.

EXAMPLE 19

Using the conditions of Example 7, a membrane is prepared from an initial polymer solution containing: 1.5 g. of poly-p-vinylphenol of moleculer weight 200,000, 1.5 g. of polyvinyl chloride of molecular weight 200,000, 300 mg. of methyltrilaurylammonium chloride, and 0.4 cm.$^3$ of tributyl orthophosphate.

A flexible, homogeneous membrane containing 4.35% of sulphur is obtained.

EXAMPLE 20

The membrane obtained in Example 19 is treated with propanesultone as in Example 8. A flexible, homogeneous membrane containing 8% of sulphur is obtained.

EXAMPLE 21

The membrane obtained in Example 20 is treated with chlorosulphonic acid as in Example 9. A flexible, homogeneous membrane containing 10% of sulphur is obtained.

EXAMPLE 22

Examples 1 to 21 are repeated with double the amounts of material for the same surface area. Flexible, homogeneous membranes are obtained which weight 6 g. per 400 cm.$^2$.

EXAMPLE 23

In Examples 1 to 22, firstly the polyphenol of high molecular weight is replaced by an equal quantity of polyphenol of molecular weight 1,000, and secondly the quaternary ammonium salt and, where appropriate, the alkyl phosphate are replaced by hexamethylphosphotriamide in an amount equal to 2 mols per phenol unit present in the polyphenol, namely 3.3 cm.$^3$ of hexamethylphosphotriamide per 1.05 g. of polyphenol. Flexible, homogeneous membranes are again obtained.

EXAMPLE 24

In Examples 1 to 22, the polyphenol is replaced by poly-(4-hydroxy-3-chlorostyrene) of molecular weight 4,000, and the quaternary ammonium salt and, where appropriate, the alkyl phosphate are replaced by hexamethylphosphotriamide in an amount equal to 1 mol per phenol unit present in the polyphenol. Flexible, homogeneous membranes are again obtained.

EXAMPLE 25

In Example 24, the poly(hydroxychlorostyrene) is replaced by poly(4-hydroxy-3-bromostyrene) of molecular weight 4,000. Flexible, homogeneous membranes are again obtained.

EXAMPLE 26

The following are dissolved in 200 cm.$^3$ of hot cyclohexanone: 3 g. of poly(4-hydroxy-3-chlorostyrene) of molecular weight 4,000, 3 g. of polyvinyl chloride of molecular weight 200,000, and 600 mg. of spiro-2:2'-propanesultone. 3.5 cm.$^3$ of hexamethylphosphotriamide are added. This solution is concentrated with heating under a partial vacuum to reduce its volume to 70 cm.$^3$. This initial polymer solution is spread on a 400 cm.$^2$ glass plate. The solvent is evaporated in an oven at 70° C. The intermediate film is immersed in a N/10 solution of potassium methoxide in isobutanol and heated under reflux for 20 hours. After the usual washing operations, a flexible, homogeneous membrane containing 2% of sulphur is obtained.

EXAMPLE 27

Example 26 is repeated, replacing the cyclohexanone by acetophenone. A similar membrane is obtained.

EXAMPLE 28

An initial polymer solution is prepared from: 2.8 g. of polyvinyl chloride of molecular weight 200,000 as a 4% solution in cyclohexanone, 1.2 g. of poly-p-vinylphenol of molecular weight 300,000, 0.2 g. of methyltrilaurylammonium chloride, and 0.2 g. of hexamethylphosphotriamide. This polymer solution is spread on a 400 cm.$^2$ glass plate and dried. The intermediate film is then heated for 4 hours at 80° C. in a bath of squalane containing 5% of hexamethylphosphotriamide. The resulting membrane is treated with propanesultone as in Example 8. A flexible, homogeneous membrane containing 2.6% of sulphur and having a substitution resistance, measured as above, of 1.5Ω cm.$^2$ is obtained.

EXAMPLE 29

The membrane obtained in Example 28 is treated with chlorosulphonic acid as in Example 9. A flexible, homogeneous membrane containing 9.6% of sulphur and having a substitution resistance, measured as above, of 0.7Ω cm.$^2$ is obtained.

EXAMPLE 30

An initial polymer solution is prepared from: 2.4 g. of polyvinyl chloride of molecular weight 200,000 as a 4% solution in cyclohexanone, 1.6 g. of poly-p-vinylphenol of molecular weight 300,000, 0.3 g. of methyltrilaurylammonium chloride, and 1 cm.$^3$ of hexamethylphosphotriamide. The polymer solution is spread on a 400 cm.$^2$ glass plate and dried. The intermediate film thus obtained is then heated to 120° C. for 5 hours in a bath of squalane containing 5% of hexamethylphosphotriamide. The membrane obtained is treated with propanesultone as in Example 8. A flexible, homogeneous membrane containing 4.8% of sulphur and having a substitution resistance, measured as above, of 1.5Ω cm.$^2$ is obtained.

EXAMPLE 31

The membrane obtained in Example 30 is treated with chlorosulphonic acid as in Example 9. A flexible, homogeneous membrane containing 7.7% of sulphur and having a substitution resistance measured as above of 1.5Ω cm.$^2$ is obtained.

EXAMPLE 32

An initial polymer solution is prepared from: 1.95 g. of polyvinyl chloride of molecular weight 200,000, 1.05 g. of poly-p-vinylphenol of molecular weight 300,000, 153 mg. of methyltrilaurylammonium chloride, and 5 cm.$^3$ hexamethylphosphotriamide. The polymer solution is spread on a 400 cm.$^2$ glass plate and dried. The intermediate film thus obtained is heated for 4 hours at 80° C. in a bath of squalane containing 5% of hexamethylphosphotriamide. The membrane which has been crosslinked in this way is treated with propanesultone as in Example 8. A flexible, homogeneous membrane containing 5.9% of sulphur and having a substitution resistance, measured as above, of 1.5Ω cm.$^2$ is obtained.

EXAMPLE 33

The membrane obtained in Example 32 is treated with 10% strength chlorosulphonic acid in chloroform for 24 hours at 20° C. A flexible, homogeneous membrane containing 9.3% of sulphur and having a substitution resistance, measured as above, of 0.7Ω cm.$^2$ is obtained.

EXAMPLE 34

An initial polymer solution is prepared from: 2.6 g. of polyvinyl chloride of molecular weight 200,000 as a 4% solution in cyclohexanone, 1.4 g. of poly-p-vinylphenol of molecular weight 300,000, 200 mg. of methyltrilaurylammonium chloride, and 624 mg. of paraxylylene dichloride. The polymer solution is spread on a 400 cm.² glass plate and dried. The intermediate film thus obtained is dipped for 10 minutes in normal aqueous potassium hydroxide solution, rapidly rinsed with distilled water, and dried in vacuo in the presence of $P_2O_5$. The intermediate film thus obtained is heated for 4 hours at 80° C. in a bath of squalane containing 5% of hexamethylphosphotriamide. The resulting membrane is treated with propanesultone as in Example 8. A flexible, homogeneous membrane containing 1.7% of sulphur is obtained.

EXAMPLE 35

The membrane obtained in Example 34 is treated with chlorosulphonic acid as in Example 9. A flexible, homogeneous membrane is obtained which contains 5.2% of sulphur and has a substitution resistance measured as above, of 1Ω cm.².

EXAMPLES 36 TO 39

Example 35 is repeated, varying the amount of paraxylylene dichloride. Flexible, homogeneous membranes are obtained having the sulphur contents indicated in the table which follows:

| Example | 36 | 37 | 38 | 39 |
|---|---|---|---|---|
| Weight of xylylene dichloride in mg | 52 | 78 | 104 | 156 |
| Percent of sulphur | 5.8 | 5.5 | 5.0 | 2.25 |

EXAMPLE 40

An initial polymer solution is prepared from: 2.4 g. of polyvinyl chloride of molecular weight 200,000 as a 4% solution in cyclohexanone, 1.6 g. of poly-p-vinylphenol of molecular weight 300,000, 0.3 g. of methyltrilaurylammonium chloride, and 1 cm.³ of hexamethylphosphotriamide. The polymer solution is spread on a 400 cm.² glass plate, and dried, and the intermediate film thus obtained is heated for 4 hours at 80° C. in a bath of squalane containing 5% of hexamethylphosphotriamide. The membrane thus obtained is treated with potassium methoxide as in Example 8 and is then immersed for 16 hours in a saturated solution of paraxylylene dichloride in ethanol under reflux. The membrane is treated with propanesultone as in Example 8. A flexible, homogeneous membrane containing 1.6% of sulphur is obtained.

EXAMPLE 41

The membrane of Example 40 is treated with chlorosulphonic acid as in Example 9. A flexible, homogeneous membrane containing 5.3% of sulphur and having a substitution resistance of 6Ω cm.² is obtained.

EXAMPLE 42

Example 40 is repeated, replacing the saturated paraxylylene dichloride solution with a 10% solution of 3,3-bis(bromomethyl)-oxetane. The resulting membrane is treated with chlorosulphonic acid as in Example 9. A flexible, homogeneous membrane containing 5.3% of sulphur and having a substitution resistance of 6Ω cm.² is obtained.

EXAMPLE 43

An initial polymer solution is prepared from: 1.8 g. of poly-p-vinylphenol of molecular weight 300,000, 4.2 g. of polyvinyl chloride of molecular weight 200,000, 100 mg. of methyltrilaurylammonium chloride, 80 cm.³ of acetophenone, and 50 cm.³ of cyclohexanone. The polymer solution is spread on a 400 cm.² glass plate and dried. This intermediate film is treated with potassium methoxide as in Example 8 and is then crosslinked by heating at 110° C. for 24 hours in a bath consisting of 4 g. of spirobi-2:2'-propanesultone dissolved in 400 cm.³ of isobutanol. The resulting membrane is treated for a further 24 hours at 23° C. with a 10% by weight solution of chlorosulphonic acid in chloroform. The membrane is washed with 200 cm.³ of normal potassium hydroxide solution and then with water until the wash waters are neutral. The final membrane obtained contains 9.6% of sulphur and has a substitution resistance of 4Ω cm.².

The permeation selectivity of this membrane is measured. This is the ability of the membrane to allow only cations to pass, with exclusion of anions. This permeation selectivity is deduced by calculation from the electromotive force existing between two aqueous KCl solutions, respectively 0.4 M and 0.8 M, separated by the membrane in question which has beforehand been saturated with an 0.6 M aqueous solution of KCl. The formula giving the permeation selectivity (P) as a percentage is:

$$\frac{P}{100} = \frac{\bar{t}^+ - t^+}{1 - t^+}$$

in which $t^+$ is the transport number of $K^+$ in an 0.6 M aqueous solution of KCl and $\bar{t}^+$ is the transport number of $K^+$ in the membrane. $\bar{t}^+$ is given by the formula:

$$\bar{t}^+ = \frac{E + E_0}{2E_0}, \text{ in which } E_0 = \frac{RT}{F} \ln \frac{a_1}{a_2}$$

where

R = the gas constant,
T = the absolute temperature,
F = the Faraday constant (96,489 coulombs per gram equivalent),
$a_1$ = activity of the electrolyte in the more concentrated compartment (calculated from the concentration of the electrolyte and the activity coefficient), and
$a_2$ = activity of the electrolyte in the less concentrated compartment.

The permeation selectivity of the final membrane prepared in the present example is 93%.

EXAMPLE 44

An initial polymer solution is prepared from: 2.4 g. of poly-p-vinylphenol of molecular weight 300,000, 3.6 g. of polyvinyl chloride of molecular weight 200,000, 300 mg. of methyltrilaurylammonium chloride, 90 cm.³ of acetophenone, and 30 cm.³ of cyclohexanone. The polymer solution is spread on a 400 cm.² glass plate. This intermediate film is treated with potassium methoxide as in Example 8, and is then heated under reflux for 24 hours in a mixture of 400 cm.³ of isobutanol and 40 cm.³ of dioxane, the said mixture being saturated with spirobi-2:2'-propanesultone. The mixture is cooled and the membrane rinsed with dioxane and treated with potassium methoxide as in Example 8. It is then heated under reflux for 24 hours in 200 cm.³ of dioxane saturated with spirobi-2:2'-propanesultone, and washed with dioxane, normal potassium hydroxide solution and water. A membrane is finally obtained which contains 4.75% of sulphur and has a substitution resistance of 6.7Ω cm.² and a permeation selectivity (measured as in Example 43) of 91%.

We claim:
1. A cation exchange membrane made of a homogeneous mixture of:
   (a) 20 to 80% by weight of a poly-p-vinylphenol, selected from the group consisting of poly-p-vinylphenol and a halogenated poly-p-vinylphenol which poly-p-vinylphenol is substituted by cation exchange radicals which are —$SO_3H$ or hydroxysulphonylalkyloxy groups and cross-linked via the oxygen atoms of its hydroxyl groups by
      (i) dehydration at 60 to 150° C.;
      (ii) treatment with a polyhalide in the presence of a base;
      (iii) reaction with a polysultone; or
      (iv) acetalisation,
   the said poly-p-vinylphenol having a molecular weight of 600 to 400,000 before cross-linking; and

(b) 80 to 20% by weight of a second polymer which is polyvinylchloride, or a copolymer of vinyl chloride with vinylidene chloride, a vinyl alkanoate or an alkyl maleate, the alkyl group containing up to 4 carbon atoms.

2. A cation exchange membrane according to claim 1 made of a homogeneous mixture of:
(a) 20 to 80% by weight of a poly-p-vinylphenol, selected from the group consisting of poly-p-vinylphenol and a halogenated poly-p-vinylphenol, which poly-p-vinylphenol is substituted by cation exchange radicals which are sulphonic radicals and cross-linked via the oxygen atoms of its hydroxyl groups by
  (i) dehydration at 60 to 150° C.,
  (ii) treatment with a polyhalide in the presence of a base;
  (iii) reaction with a polysultone; or
  (iv) acetalisation,
the said poly-p-vinylphenol having a molecular weight of 600 to 400,000 before cross-linking; and
(b) 80 to 20% by weight of a second polymer which is polyvinylchloride, or a copolymer of vinyl chloride with vinylidene chloride, a vinyl alkanoate or an alkyl maleate, the alkyl group containing up to 4 carbon atoms.

3. A membrane according to claim 2 in which the poly-p-vinylphenol makes up 30 to 50% by weight of the mixture of (a) and (b).

4. A membrane according to claim 2 in which the second polymer has a molecular weight of over 150,000 and is polyvinyl chloride, or a copolymer of vinyl chloride with vinylidene chloride or vinyl acetate.

5. A membrane according to claim 2 in which the cross-linking is effected by dehydration at 80° to 120° C. in an inert liquid medium.

6. A membrane according to claim 5 in which the liquid medium contains hexamethylphosphotriamide or dioxane.

7. A membrane according to claim 2 in which the cross-linking is effected by treatment with an o- or p-xylene dihalide or 3,3-bis(halogenomethyl)-oxetane in the presence of a base.

8. A membrane according to claim 2 in which both cross-linking and introduction of cation-exchange radicals is effected by reaction with spirobi-2:2'-propanesultone.

9. A membrane according to claim 2 in which cation-exchange radicals are introduced by sulphonation.

10. A membrane according to claim 9 in which the sulphonating agent is sulphuric acid, oleum, or chlorosulphonic acid.

11. A membrane according to claim 9 in which the sulphonating agent is a monosultone.

12. A membrane according to claim 2 which also contains a quaternary ammonium salt in an amount from 2 to 10% by weight of the membrane.

13. A membrane according to claim 12 in which the quaternary ammonium salt is a sulphobetaine containing 6 to 20 carbon atoms.

14. A membrane according to claim 2 which also contains a hexaalkylphosphotriamide in a proportion of 1 to 3 mols per phenol unit in the poly-p-vinylphenol.

15. A membrane according to claim 14 in which the hexaalkylphosphotriamide is hexamethylphosphotriamide.

16. A membrane according to claim 2 weighing 10 to 300 g. per square metre.

17. A membrane according to claim 1 in which both cross-linking and introduction of cation-exchange radicals is effected by reaction with spirobi-2:2'-propanesultone.

18. A membrane according to claim 1 in which cation-exchange radicals are introduced by sulphonation.

19. A membrane according to claim 18 in which the sulphonating agent is a monosultone.

References Cited
FOREIGN PATENTS
948,961   2/1964   Great Britain.

OTHER REFERENCES
Packham, J. Chem. Soc., 1964, 2617–24.

MELVIN GOLDSTEIN, Primary Examiner

U.S. Cl. X.R.

204—296; 260—899